United States Patent
Harriott et al.

(10) Patent No.: US 9,579,628 B2
(45) Date of Patent: Feb. 28, 2017

(54) PERFORATED ADSORBENT PARTICLES

(71) Applicant: AIR PRODUCTS AND CHEMICALS, INC., Allentown, PA (US)

(72) Inventors: George Matthew Harriott, Allentown, PA (US); Bo Jin, Orefield, PA (US); Christopher Michael O'Neill, Allentown, PA (US); Edward Landis Weist, Jr., Macungie, PA (US); Roger Dean Whitley, Allentown, PA (US); Junxiao Wu, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/754,749

(22) Filed: Jun. 30, 2015

(65) Prior Publication Data
US 2016/0303542 A1    Oct. 20, 2016

Related U.S. Application Data

(63) Continuation-in-part of application No. 14/686,813, filed on Apr. 15, 2015.

(51) Int. Cl.
*B01D 53/04* (2006.01)
*B01J 20/00* (2006.01)
(Continued)

(52) U.S. Cl.
CPC ........ *B01J 20/3064* (2013.01); *B01D 53/047* (2013.01); *B01D 53/0407* (2013.01);
(Continued)

(58) Field of Classification Search
CPC .............. B01D 53/0407; B01D 53/047; B01D 53/0476; B01D 2253/102; B01D 2253/108;
(Continued)

(56) References Cited

U.S. PATENT DOCUMENTS 3,825,460 A * 7/1974 Yoshikawa et al. ..... B01J 21/18
156/296
5,168,090 A  12/1992 Ebner et al.
(Continued)

FOREIGN PATENT DOCUMENTS

DE  102011050769 A1  12/2012
EP    1080771 A1 *  3/2001
(Continued)

OTHER PUBLICATIONS

Tukac, et al., Influence of Catalyst Particles Orientation on the pressure drop and the liquid dispersion in the trickle bed reactor, Chemical Engineering Science, vol. 47, No. 9-11, pp. 2227-2232, 1992.
(Continued)

*Primary Examiner* — Frank Lawrence
(74) *Attorney, Agent, or Firm* — Bryan C. Hoke, Jr.

(57) ABSTRACT

An adsorption vessel comprising a packed bed region of adsorbent particles contiguously arranged, comprising a perforated adsorbent particles, a gas separation process using the perforated adsorbent particles, and methods for making the perforated adsorbent particles. The perforated adsorbent particles each comprise an adsorbent material where the perforated adsorbent particles each have at least 10 channels extending through the particle. The equivalent diameter of the channels may range from 0.05 mm to 1.5 mm, and the void fraction of the channels may range from 0.05 to 0.5.

17 Claims, 2 Drawing Sheets

(51) Int. Cl.
- *B01J 20/30* (2006.01)
- *B01D 53/047* (2006.01)
- *B01J 20/20* (2006.01)
- *B01J 20/18* (2006.01)

(52) U.S. Cl.
CPC ........ *B01D 53/0476* (2013.01); *B01J 20/186* (2013.01); *B01J 20/205* (2013.01); *B01J 20/3007* (2013.01); *B01D 2253/102* (2013.01); *B01D 2253/108* (2013.01); *B01D 2253/304* (2013.01); *B01D 2259/4143* (2013.01)

(58) Field of Classification Search
CPC ....... B01D 2253/304; B01D 2259/4143; B01J 20/3064; B01J 20/186; B01J 20/205; B01J 20/3007; B01J 20/3078; B01J 20/3085; B01J 20/3225
USPC ......... 95/90, 96; 96/121, 108; 502/400, 415, 502/416, 439
See application file for complete search history.

(56) References Cited

U.S. PATENT DOCUMENTS

| | | | |
|---|---|---|---|
| 5,316,993 A | 5/1994 | Sextl et al. | |
| 6,284,021 B1 | 9/2001 | Lu et al. | |
| 6,383,422 B1 * | 5/2002 | Hoffschmidt | B01D 39/2093 210/510.1 |
| 7,014,689 B2 | 3/2006 | Van Lookeren et al. | |
| 8,349,758 B2 | 1/2013 | Gabriel et al. | |
| 8,529,663 B2 | 9/2013 | Reyes et al. | |
| 2003/0113538 A1 | 6/2003 | Tom et al. | |
| 2007/0000508 A1 | 1/2007 | Xue et al. | |
| 2012/0010070 A1 | 1/2012 | Blucher et al. | |
| 2012/0135860 A1 | 5/2012 | Carlsson et al. | |
| 2013/0068101 A1 | 3/2013 | Knapp et al. | |
| 2014/0298992 A1 | 10/2014 | Carruthers et al. | |

FOREIGN PATENT DOCUMENTS

| | | |
|---|---|---|
| EP | 2080771 A2 | 7/2009 |
| WO | 9528279 | 10/1995 |
| WO | 2006009453 | 1/2006 |
| WO | 2008080080 | 7/2008 |
| WO | 2011114017 A2 | 9/2011 |
| WO | 2013064754 A1 | 5/2013 |

OTHER PUBLICATIONS

Snow, et al., Good Catalyst loading benefits operations, Oil and Gas Journal, vol. 75, No. 21, pp. 61-65.

Oliveira, et al., Methane steam reforming in large pore catalyst, Chemical Engineering Science, 65, pp. 1539-1550, 2010.

Johannessen, et al., Optimal Distributor networks in Porous Catalyst Pellets. I. molecular Diffusion, Ind. Eng. Chem. Res., vol. 46, pp. 4245-4256, 2007.

Wang, et al., Optimizing transport in nanostructured catalysts: A computational Study, Chemical Engineering Science, vol. 62, pp. 5110-5116, 2007.

Rezaei, et al., Optimal design of engineered gas adsorbents: Pore-scale level, Chemical Engineering Science, vol. 69, pp. 20-278, 2012.

Desmet, et al., Performance limits of isothermal packed bed and perforated monolithic bed reactors operated under laminar flow conditions, Part II: performance comparison and design considerations, Chemical Engineering Science, vol. 58, pp. 3203-3214, 2003.

Valtchev, et al., High energy Ion Irradiation-Induced Ordered Macropores in Zeolite Crystals, Journal of the American Chemical Society, vol. 133, pp. 18950-18956, 2011.

Bhandari, et al, Hollow Fiber Sorbents for desulfurization of Natural Gas, In. Eng. Chem. Res., vol. 49, pp. 12038-12050, 2010.

Delft University of Technology, Monolith Reactors, Catalysis Engineering, Jun. 2, 1999.

Forzatti, Present status and perspectives in de NOx SCR catalysis, Applied Catalysis A: General, vol. 222, pp. 221-236, 2001.

Li, et al., Zeolite Monoliths for Air Separation, Part 1: Manufacture and Characterization, Trans IChemE, vol. 76, Part A, Nov. 1998.

Li, et al., Zeolite Monoliths for Air Separation, Part 2: Oxygen Enrichment, Pressure Drop and Pressurization, IChemE, vol. 76, Part A, Nov. 1998.

Nakajima, et al., The state-of-the-art technology of NOx control, Catalysis Today vol. 29, pp. 109-115, 1996.

* cited by examiner

FIG. 1

PERFORATED ADSORBENT PARTICLES

CROSS-REFERENCE TO RELATED APPLICATIONS

This application is a continuation-in-part of U.S. application Ser. No. 14/686,813, titled "Perforated Adsorbent Particles," filed Apr. 15, 2015

BACKGROUND

The present invention relates to non-cryogenic separation of gas mixtures by adsorption.

Gas separation by adsorption is well-known. The literature is replete with descriptions of gas separation by adsorption.

The effect of adsorption particles on mass transport and flow resistance must be considered in the design of adsorption units and processes. The constraints of particle size on adsorption are well-known: diffusional mass transport is favored in small particles while large particles reduce flow resistance through the adsorption bed thereby reducing pressure drop through the adsorption bed. As a result, the particle size must be selected to balance these conflicting objectives.

Industry desires adsorption particles that provide improved diffusional mass transport while decreasing the pressure drop in the adsorption bed.

BRIEF SUMMARY

The present invention relates generally to gas separation by adsorption, and more specifically to an adsorbent particle, an adsorption bed containing a plurality of the adsorbent particles, a gas separation process using a plurality of the adsorbent particles, and methods for making the adsorbent particles.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. An adsorption vessel (40) comprising:
a packed bed region (80) of adsorbent particles contiguously arranged, comprising a plurality of perforated adsorbent particles (10),
wherein each perforated adsorbent particle (10) comprises an adsorbent material capable of preferentially adsorbing at least one more strongly adsorbable gaseous component in a mixture comprising at least two gaseous components comprising the at least one more strongly adsorbable component and at least one less strongly adsorbable component, wherein the adsorbent material is a material selected from the group consisting of activated alumina, activated carbon, zeolites, mesopore-structured materials, carbon molecular sieve, metal-organic framework materials, silica gel, and combinations thereof; and
wherein each perforated adsorbent particle (10) defines a respective plurality of channels (20) numbering at least 10, the respective plurality of channels (20) extending through each perforated adsorbent particle (10) in a lengthwise direction from a first end (22) to a second end (24).

Aspect 2. The adsorption vessel (40) of aspect 1 wherein the plurality of perforated adsorbent particles (10) number at least 100; and
wherein wherein the packed bed region (80) has an interparticle void fraction ranging from 0.09 to 0.5.

Aspect 3. The adsorption vessel (40) of aspect 1 or aspect 2 wherein the adsorbent particles are irregularly arranged in the packed bed region (80).

Aspect 4. The adsorption vessel (40) of any one of the preceding aspects, the adsorption vessel (40) having an inlet and an outlet for the mixture comprising the at least two gaseous components, the inlet and the outlet defining a principal direction of flow through the adsorption vessel (40) during an adsorption cycle feed step, wherein between 25% and 35% of the channels (20) of the plurality of the adsorbent particles (10) are substantially aligned with the principal direction of flow through the adsorption vessel (40).

Aspect 5. The adsorption vessel (40) of any one of the preceding aspects wherein the adsorbent particles are contiguously arranged in a horizontal and a vertical direction of the packed bed region (80).

Aspect 6. The adsorption vessel (40) of any one of the preceding aspects wherein the packed bed contains the adsorbent particles as a bulk material (i.e. as a loose fill).

Aspect 7. The adsorption vessel (40) of any one of the preceding aspects wherein each adsorbent particle of the adsorbent particles in the packed bed region (80) lies beside at least a portion of at least one neighboring adsorbent particle of the adsorbent particles in the packed bed region (80) and lies above or below at least a portion of at least one other neighboring adsorbent particle of the adsorbent particles in the packed bed region (80).

Aspect 8. The adsorption vessel (40) of any one of the preceding aspects wherein the adsorbent particles comprise interior adsorbent particles, each interior adsorbent particle surrounded in all directions by other adsorbent particles in the packed bed region (80).

Aspect 9. The adsorption vessel of any one of the preceding aspects wherein channels of a first group of adsorbent particles of the plurality of perforated adsorbent particles are inclined with respect to channels of a second group of adsorbent particles of the plurality of perforated adsorbent particles thereby forming an irregular channel pattern due to the adsorbent particles being packed.

Aspect 10. The adsorption vessel (40) of any one of the preceding aspects wherein each of the adsorbent particles has an upper end portion facing upward and a lower end portion facing downward, the upper end portion of a first group of adsorbent particles of the plurality of perforated adsorbent particles (10) being in contact with the lower end portion of a second group of adsorbent particles of the packed bed region (80) and/or the lower end portion of the first group of adsorbent particles being in contact with the upper end portion of a third group of adsorbent particles of the packed bed region (80).

Aspect 11. The adsorption vessel (40) of the preceding aspect, wherein the second group of adsorbent particles and/or the third group of adsorbent particles are perforated adsorbent particles of the plurality of perforated adsorbent particles.

Aspect 12. The adsorption vessel (40) of any one of the preceding aspects wherein each of the adsorbent particles has a left surface facing horizontally to the left and a right surface facing horizontally to the right, the left surfaces of first adsorbent particles of the plurality of perforated adsorbent particles being in contact with the right surfaces of second adsorbent particles of the packed bed, and/or the right surfaces of the first adsorbent particles being in contact with the left surfaces of third adsorbent particles of the packed bed.

Aspect 13. The adsorption vessel (40) of the preceding aspect wherein the second adsorbent particles and/or the third adsorbent particles are perforated adsorbent particles of the plurality of perforated adsorbent particles.

Aspect 14. The adsorbent vessel (40) of any one of the preceding aspects wherein each perforated adsorbent particle defines a respective plurality of channels (20) numbering at least 20, or at least 50, or at least 100, or at least 200, or at least 500, or at least 1000, the respective plurality of channels extending through each perforated adsorbent particle (10) in the lengthwise direction from the first end (22) to the second end (24).

Aspect 15. The adsorption vessel (40) of any one of the preceding aspects wherein each channel of the plurality of channels (20) has an equivalent diameter, d, ranging from 0.05 mm to 1.5 mm, or ranging from 0.05 mm to 0.8 mm, or ranging from 0.05 mm to 0.5 mm, where $$d = 2\sqrt{\frac{A}{\pi}},$$

where A is the cross-sectional area normal to the lengthwise direction for each respective channel.

Aspect 16. The adsorption vessel (40) of any one of the preceding aspects wherein each channel of the plurality of channels (20) has a respective distance of travel through the channel from the first end (22) to the second end (24) where the respective distance of travel is less than 150% of a respective straight-line distance from the first end (22) to the second end (24) for each channel.

Aspect 17. The adsorption vessel (40) of any one of the preceding aspects wherein each of the plurality of channels (20) is straight or substantially straight.

Aspect 18. The adsorption vessel (40) of any one of the preceding aspects wherein the channels of the plurality of channels (20) are parallel or substantially parallel.

Aspect 19. The adsorption vessel (40) of any one of the preceding aspects wherein the channels of the plurality of channels do not intersect one another.

Aspect 20. The adsorption vessel (40) of any one of the preceding aspects wherein each perforated adsorbent particle of the plurality of perforated adsorbent particles has a void fraction, $$\frac{V_C}{V_T},$$

ranging from 0.05 to 0.5, where $V_C$ is the void volume in the perforated adsorbent particle formed by a total number of channels in each perforated adsorbent particle, and $V_T$ is the total (bulk) volume of the perforated adsorbent particle including the void volume, each perforated adsorbent particle having no more and no less than the total number of channels.

Aspect 21. The adsorption vessel (40) of any one of the preceding aspects wherein each adsorbent particle of the plurality of adsorbent particles has a longest spatial dimension wherein the longest spatial dimension is from 1 mm to 50 mm or from 1 mm to 15 mm.

Aspect 22. The adsorption vessel (40) of any one of the preceding aspects wherein the adsorbent material is a material selected from the group consisting of NaX zeolite, CaX zeolite, LiX zeolite, carbon molecular sieve, and combinations thereof.

Aspect 23. The adsorption vessel (40) of any one of aspects 1 to 21 wherein the adsorbent material is a material selected from the group consisting of activated carbon, 5A zeolite, CaX zeolite, 13X zeolite, and combinations thereof.

Aspect 24. The adsorption vessel (40) of any one of the preceding aspects, wherein the plurality of channels (20) in each perforated adsorbent particle (10) is obtained by post-processing of a preformed particle intermediate for each perforated adsorbent particle.

Aspect 25. The adsorption vessel (40) of the preceding aspect, wherein post-processing includes removing material obstructing the plurality of channels (20) within each preformed particle intermediate.

Aspect 26. The adsorption vessel (40) of any one of aspects 1 to 23, wherein each perforated adsorbent particle (10) of the plurality of perforated adsorbent particles comprises hollow fibers of the adsorbent material and a matrix material, the hollow fibers embedded in or bonded together by the matrix material, wherein the channels of the plurality of channels (20) are defined, each, by one of the hollow fibers.

Aspect 27. The adsorption vessel (40) of any one of the preceding aspects, the adsorption vessel (40) having an inlet and an outlet for the mixture comprising the at least two gaseous components, the inlet and the outlet defining a principal direction of flow through the adsorption vessel (40) during an adsorption cycle feed step, wherein at least 35%, or at least 50% of the channels (20) of the plurality of the adsorbent particles (10) are substantially aligned with the principal direction of flow through the adsorption vessel (40).

Aspect 28. The adsorption vessel (40) of any one of the preceding aspects wherein the packed bed region comprises a first layer comprising the plurality of perforated adsorbent particles and a second layer of a plurality of adsorbent particles not having a plurality of channels extending through the adsorbent particle in a lengthwise direction from a first end (22) to a second end (24) defined therein.

Aspect 29. A process for separating a gaseous mixture (30) comprising at least two gaseous components, the process comprising:
  passing the gaseous mixture (30) to an adsorption unit (50), the adsorption unit (50) comprising one or more adsorption vessels (40) according to any one of aspects 1 to 28; and
  separating the at least one more strongly adsorbable component from an at least one less strongly adsorbable component in the gaseous mixture (30) in the adsorption unit (50) to form a first product stream (60) enriched in the at least one less strongly adsorbable component and a second product stream (70) enriched in the at least one more strongly adsorbable component.

Aspect 30. The process of the preceding aspect wherein the adsorption unit (50) is a pressure swing adsorption unit.

Aspect 31. A method for making a plurality of perforated adsorbent particles for use in the adsorption vessel (40) according to any one of aspects 1 to 28 and/or the process of aspect 29 or aspect 30, the method comprising:
  (a) forming a composite rope comprising a precursor for forming the adsorbent material and fibers embedded in the precursor such that the fibers extend in a lengthwise direction of the composite rope, wherein the adsorbent material is a material selected from the group consisting of activated alumina, activated carbon, zeolites, mesopore-structured materials, carbon molecular sieve, metal-organic framework materials, silica gel, and combinations thereof;

(b) forming dried particle intermediates by drying and dividing the composite rope or by dividing the composite rope to form particle intermediates and drying the particle intermediates; and (c) removing the fibers from the particle intermediates by chemically dissolving the fibers and/or firing to burn out the fibers to form the plurality of channels in each adsorbent particle.

Aspect 32. The method of the preceding aspect wherein step (a) comprises extruding a paste comprising the fibers and the precursor through an orifice to form the composite rope.

Aspect 33. The method of aspect 31 wherein step (a) comprises coating the fibers with a suspension containing the precursor to form a plurality of fibrous unit cells and drawing the plurality of fibrous unit cells together to form the composite rope.

Aspect 34. The method of the preceding aspect wherein the fibers of the plurality of fibers are coated by spray-coating or dip-coating.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The terms "rich" or "enriched" means having a greater mole % concentration of the indicated gas than the original stream from which it was formed.

The present invention relates generally to gas separation by adsorption, and more specifically to an adsorption vessel containing a packed bed of adsorption particles, a gas separation process using a the adsorption vessel with the adsorption particles, and methods for making the adsorbent particles. The adsorption particles may be used in any adsorption-type process, for example, pressure swing adsorption (PSA), or temperature swing adsorption (TSA). As used herein, the term pressure swing adsorption includes what is sometimes referred to as vacuum swing adsorption (VSA).

Figure 1:
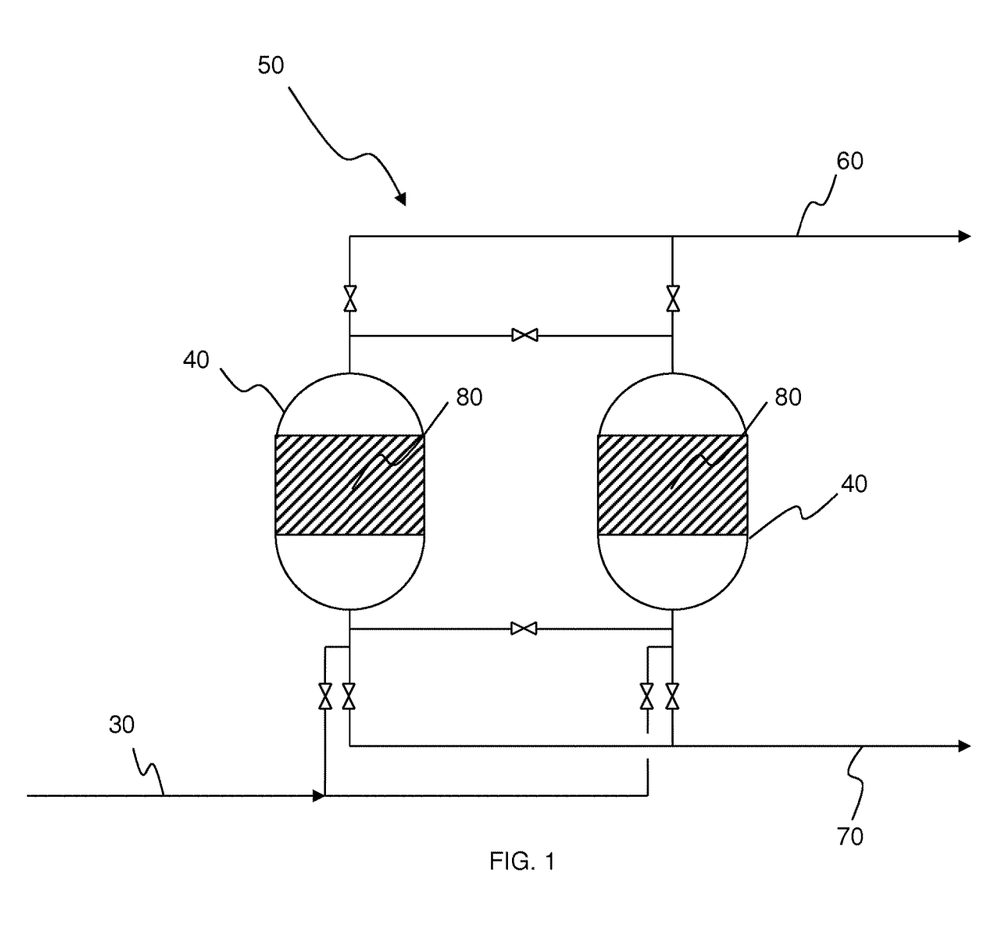
FIG. 1 is a process flow diagram of an adsorption unit.

With reference to FIG. 1, the present invention relates to an adsorption vessel 40 comprising a packed bed of adsorbent particles contiguously arranged comprising a plurality of perforated adsorbent particles as described herein.

The shell of the adsorption vessel may be constructed from any suitable material known in the art. The adsorption vessel may contain a screen or other support structure to support the packed bed region. The adsorption vessel may contain a screen or other structure to hinder fluidization of the packed bed.

The plurality of perforated adsorbent particles in the packed bed region 80 may number at least 100. Depending on the size of the adsorption vessel, the number of adsorbent particles contained therein may number up to 10's of billions or 100's of billions. The packed bed region may have an interparticle void fraction ranging from 0.09 to 0.5.

Particles contiguously arranged means that each of the particles contact at least one other particle in the packed bed region throughout in an unbroken sequence.

The interparticle void fraction or voidage, $\epsilon$, of a packed bed region of particles is a common term used in chemical engineering. The interparticle void fraction for the packed bed region can be determined from the mean particle density, $\bar{\rho}_p$ and the bed density, $\rho_b$, using the formula, $$\varepsilon = 1 - \left(\frac{\rho_b}{\bar{\rho}_p}\right),$$

where a particle density, $\rho_p$, is the mass of the particle divided by the total enclosed volume of the particle (including the volume of the channels and pores), the mean particle density is the mean of the particle densities for the plurality of particles in the packed bed region, and the bed density, $\rho_b$, is the mass of the particles in the packed bed region divided by the volume of the packed bed region containing the particles.

For example, if the plurality of particles in a packed bed region occupies space in a vessel having a 1 m diameter and the height of the packed bed region is 1.27 m, the volume is 1 m³. If the mass of the plurality of particles in the packed bed region is 720 kg, then the bed density is 720 kg/m³. If the mean of the particle densities in the packed bed region is 1200 kg/m³, then the interparticle void fraction is 0.40.

Since the particles in the packed bed region are contiguously arranged, a first group of particles separated from a second group of particles by a void layer would constitute two separate packed bed regions contiguously arranged each group having a respective void fraction. The void layer separating the groups is not considered in the calculation of the void fraction.

The adsorption particles may be irregularly arranged in the packed bed region.

The adsorption particles may be randomly packed in the packed bed region. The packed bed region may contain the adsorbent particles as a bulk material (i.e. as a loose fill). Each adsorbent particle of the adsorbent particles in the packed bed region may lie beside at least a portion of at least one neighboring adsorbent particle of the adsorbent particles in the packed bed region and lie above or below at least a portion of at least one other neighboring adsorbent particle of the adsorbent particles in the packed bed region. The packed bed region may have interior adsorbent particles where each interior adsorbent particle is surrounded in all directions by other adsorbent particles in the packed bed region.

The adsorption particles may be contiguously arranged in a horizontal and a vertical direction of the packed bed region. Each of the adsorbent particles may have a left surface facing horizontally to the left and a right surface facing horizontally to the right. The left surfaces of first adsorbent particles of the plurality of perforated adsorbent particles may contact the right surfaces of second adsorbent particles of the packed bed, and/or the right surfaces of the first adsorbent particles may contact the left surfaces of third adsorbent particles of the packed bed. The second adsorbent particles and/or the third adsorbent particles may be perforated adsorbent particles of the plurality of perforated adsorbent particles.

Each of the adsorbent particles may have an upper end portion facing upward and a lower end portion facing downward. The upper end portion of a first group of adsorbent particles of the plurality of perforated adsorbent particles may be in contact with the lower end portion of a second group of adsorbent particles of the packed bed region and/or the lower end portion of the first group of adsorbent particles may be in contact with the upper end portion of a third group of adsorbent particles of the packed bed region. The second adsorbent particles and/or the third adsorbent particles may be perforated adsorbent particles of the plurality of perforated adsorbent particles.

Channels of a first group of adsorbent particles of the plurality of perforated adsorbent particles may be inclined with respect to channels of second adsorbent particles of the plurality of perforated adsorbent particles thereby forming an irregular channel pattern due to the adsorbent particles being packed.

The adsorbent particles comprise an adsorbent material capable of preferentially adsorbing at least one more strongly adsorbable gaseous component in a mixture comprising at least two gaseous components comprising the at least one more strongly adsorbable component and at least one less strongly adsorbable component. The gas mixture may be for example a synthesis gas stream where $H_2$ is separated from a mixture comprising $H_2$, $CO_2$, and CO, or the gas mixture may be air where $O_2$ is separated from $N_2$. As used herein, "preferentially adsorbing" includes both equilibrium and/or kinetic mechanisms.

Any suitable adsorbent material known in the art may be used. The adsorbent material may be a material selected from the group consisting of activated alumina, activated carbon, zeolites, mesopore-structured materials, carbon molecular sieve, metal-organic framework materials, silica gel, and combinations thereof. As used herein, the term "zeolites" includes both naturally-occurring and synthetically-made forms.

Adsorbent materials suitable for separating air to produce oxygen include zeolites, such as NaX, CaX, and LiX, where X zeolite may have a silicon/aluminum molar composition ratio from 1.0 to 1.25. This includes LSX zeolite.

Carbon molecular sieve is a suitable adsorbent for separating air to produce nitrogen.

Adsorbent materials suitable for separating a reformate comprising $H_2$, CO, and $CO_2$ to produce a hydrogen product gas include activated carbon, 5A zeolite, CaX zeolite, and/or 13X zeolite.

Figure 2:
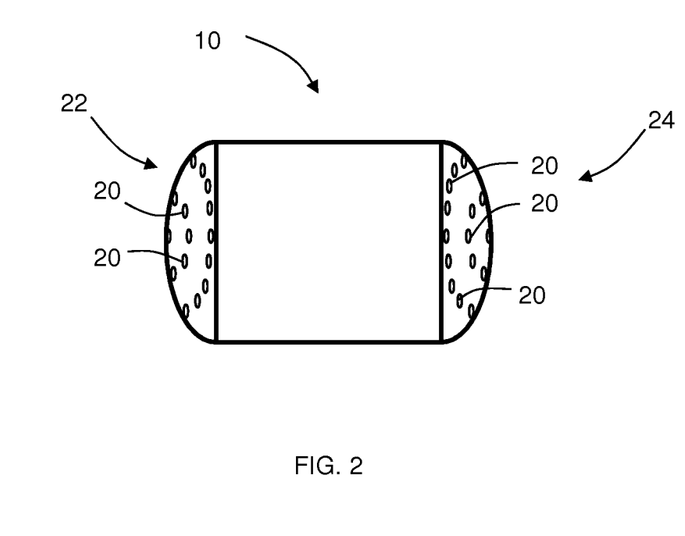
FIG. 2 is a side view of a cylindrical adsorbent particle having domed ends.
Figure 3:
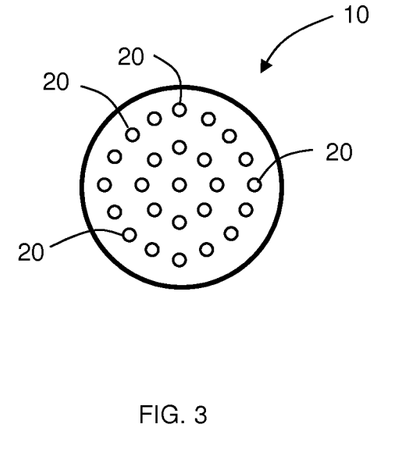
FIG. 3 is a cross-section of the cylindrical adsorbent particle of FIG. 2.

Referring to FIG. 2 and FIG. 3, a perforated adsorbent particle 10 has a plurality of channels 20 (perforations) extending through the adsorbent particle 10. The plurality of channels 20 extend through the particle in a lengthwise direction from a first end 22 to a second end 24. The adsorbent particle has at least 10 channels. The perforated adsorbent particle may have at least 20 channels, or at least 50 channels, or at least 100 channels, or at least 200 channels, or at least 500 channels. The particle may have as many as 1000 channels or as many as 5000 channels depending on the size of the adsorbent particle.

The term "perforated adsorbent particle(s)" as used herein is defined as adsorbent particle(s) having a plurality of through-channels.

The cross section of the channels 20 may be any desired shape, for example, circular, elliptical, multi-lobed, polygonal, or the like. The internal surface of the channels may contain flutes, ridges, dimples, knurls, or other perturbations. The cross section may be constant over the length of the channels or may vary over the length.

Each channel of the plurality of channels has its respective equivalent diameter, d. The equivalent diameters of the plurality of channels may range from 0.05 mm to 1.5 mm or range from 0.05 mm to 0.8 mm, or range from 0.05 mm to 0.5 mm. The equivalent diameter for each of the plurality of channels may be the same or they may be different from one another. The equivalent diameter, d, is defined herein as $$d = 2\sqrt{\frac{A}{\pi}}$$

where A is the cross-sectional area normal to the lengthwise direction for each respective channel.

The cross-sectional area may be measured by image analysis of photomicrographs. The area may be determined using software for calculating area by pixel counting. Commercial software is available for pixel counting, for example, ImageJ, which is available for download from the National Institutes of Health website.

The cross-sectional area should be large enough to supply adequate flow that matches or exceeds the diffusional mass transfer rate within adjacent adsorbent material.

Each channel of the plurality of channels 20 may have a respective distance of travel through the channel from the first end 22 to the second end 24 where the respective distance of travel is less than 150% of a respective straight-line distance from the first end 22 to the second end 24 for each channel.

The plurality of channels 20 may be straight or substantially straight.

The plurality of channels 20 may extend through the adsorption particle without intersecting one another; the channels of the plurality of channels are separated one from another throughout their respective length.

The plurality of channels 20 may be parallel or substantially parallel.

Channels 20 that are at least substantially straight and at least substantially parallel and aligned with the principal direction of flow through an adsorption vessel or bed are most effective, but significant benefits can result even with channels that are randomly oriented with respect to the flow in the adsorption vessel or bed.

The plurality of channels 20 forms a void volume, $V_C$, in the particle, where the void volume is the sum of the volumes of all of the channels in the adsorbent particle. The adsorbent particle may have a void fraction, $$\frac{V_C}{V_T},$$

ranging from 0.05 to 0.5, where $V_T$ is the total (i.e. bulk) volume of the adsorbent particle. The total volume, $V_T$, of the adsorbent particle is the bulk volume of the entire particle including the void volume. For example, for a particle having the shape of a cylinder with diameter, D, and a length, L, the total volume, $V_T$, can be calculated by the equation $$V_T = \frac{\pi D^2 L}{4}.$$

The adsorbent particle may be formed in any suitable shape. As shown in FIG. 2, the adsorbent particle 10 may be a cylinder with domed ends. The adsorbent particle may be a cylinder, a sphere, a spheroid, or an irregular shape. The external surfaces may feature flutes, ridges, knurls, and/or dimples to either promote a particular type of packing or reduce flow resistance. The adsorbent material may be in any shape capable of being formed by extrusion, for example, having a circular, elliptical, polygonal, or multi-lobed cross-section. The adsorbent material may be in any shape capable of being formed by pressing.

The adsorbent particle may have a longest spatial dimension ranging from 1 mm to 50 mm, or ranging from 1 mm to 15 mm.

Cylindrical particles and extrudates may have domed ends to ensure channels are not blocked by neighboring particles in a random or semi-regular packing. Cylinders, spheroids and extrudates of moderate aspect (height/diameter) ratio (0.5-2.0) are of particular interest as they pack more tightly than spheres, thereby partially offsetting the channel void. Particles of aspect ratio greater than one may be (partially) axially orientated by screens during the filling process.

Magnetic fields may be employed to favor axial orientation of particles containing iron or other magnetically-susceptible components. Tapping, shaking, pulsed fluidization and other methods of disrupting the packing may be applied to promote particle alignment either during or after the filling process. Particle exteriors may incorporate flats, flutes, dimples or other deliberate perturbations to the macroscopic shape that facilitate particle alignment.

For beds where particle alignment is promoted at least 35%, or at least 50% and no more than 90% or no more than 80% of the adsorbent particles may be substantially aligned in the adsorption vessel or bed such that the channels of the aligned adsorption particles are substantially aligned with a principal direction of gas flow through the adsorption vessel or bed. The principal direction of gas flow points from an inlet of the adsorption vessel or bed through which a gaseous mixture may flow into the adsorption vessel or bed to an outflow of the adsorption vessel or bed through which a less strongly adsorbable component of the gaseous mixture may leave the adsorption vessel or bed. The principal direction of flow may be parallel to a shortest line connecting the inlet with the outlet. Channels of the perforated adsorbent particles are defined herein as substantially aligned with the principal direction of gas flow if the acute angle defined between the principal direction of gas flow through the adsorption vessel and the lengthwise direction of the channels in the perforated adsorbent particle is less than 45°.

While particle alignment may be desired, randomly packed beds of perforated particles also provide significant benefits. The perforated particles may be randomly packed. For randomly packed beds, between 25% and 35% of the adsorbent particles may be substantially aligned in the adsorption vessel or bed such that the channels of the aligned adsorption particles are substantially aligned with a principal direction of gas flow through the adsorption vessel or bed.

The present invention also relates to methods for making adsorbent particles having a plurality of channels extending therethrough.

The adsorption particles with channels may be fabricated by extrusion, etching, or aggregation.

In an extrusion-based method, the method for making a plurality of adsorbent particles comprises extruding a paste comprising fibers and a precursor for forming the adsorbent material through an orifice to make a rope of extruded paste. The adsorbent material may be a material selected from the group consisting of activated alumina, activated carbon, zeolites, mesopore-structured materials, carbon molecular sieve, metal-organic framework materials, silica gel, and combinations thereof.

Extrusion is a well-established method of forming cylindrical adsorbent particles on the order of millimeters in diameter. The paste to be extruded may be a mixture of the adsorbent material and one or more of binders, surfactants, and/or pore forming agents. Fibers suitable for forming channels with the desired effective diameter may be added to the paste which can either be dissolved or burned out in a subsequent processing step. High shear rates in the extruder will preferentially align the fibers in the direction of extrusion.

The extrusion-based method comprises forming dried particle intermediates by dividing and drying the rope of extruded paste. The dried particle intermediates may be formed by first dividing the rope of extruded paste into a plurality of particle intermediates and then drying the particle intermediates or the rope of extruded paste may be first dried and then divided. Alternatively the rope of extruded paste may be partially dried, divided and then further dried.

The rope may be divided by any means, for example by cutting, breaking, and the like.

The extrusion-based method further comprises removing the fibers from the particle intermediates by chemically dissolving the fibers and/or firing to burn out the fibers to form the plurality of channels in each adsorbent particle.

In the case of carbon molecular sieves, carbonization requires no $O_2$ and high temperatures (400-1200° C.). If fibers are to be removed by combustion, this can be performed at a lower temperature with oxygen prior to carbonization. Alternatively, the fiber may be an organic structure which, when carbonized, will provide an open structure relative to the carbon molecular sieve. This could eliminate the lower temperature burn out step.

A related method involves etching channels as track-etched membranes are formed. Straight through channels have been drilled in zeolite particles with this procedure (cf. Valtchev et al., "High energy ion-radiation-induced ordered macropores in zeolite crystals," *J. Am. Chem. Soc.* 133, 18950-18956 (2001)).

An alternative approach, drawing on technology employed for film coating and fiber processing is to start with unit cells that are subsequently fused into a larger particle. The method comprises coating a plurality of fibers with a suspension or slurry containing a precursor for forming the adsorbent material to form a plurality of fibrous unit cells. The fibrous unit cells could be formed by spray- or dip-coating a thin film of adsorbent material on fine threads. When the coating is still tacky, parallel strands of fibrous unit cells can be drawn or pulled together axially to form an aggregated rope of the desired macroscopic diameter. Dried particle intermediates are formed by dividing and drying the rope. The dried particle intermediates may be formed by first dividing the rope into a plurality of particle intermediates and then drying the particle intermediates or the rope may be first dried and then divided. Alternatively the rope may be partially dried, divided and then further dried. The rope may be divided by any means, for example by cutting, breaking, and the like.

Finally, the fibers are removed from the particle intermediates by chemically dissolving and/or firing to burn out the fibers to form the plurality of channels in each adsorbent particle.

Yet another method uses membrane technology to form perforated unit cells of hollow adsorbent fibers, then bonding aligned fibers to create a channeled cord from which individual particles are cut (cf. Bhandari et al., "Hollow fiber sorbents for desulfurization of natural gas," *Ind. Eng. Chem. Res.*, vol. 49, pp. 12038-12050 (2010)).

Established methods in coating technology and routine techniques and equipment for handling fine threads from fabric manufacturing may be applied with some modification to build perforated particles of precise geometry.

The present invention also relates to a process for separating a gaseous mixture comprising at least two gaseous components. The gas separation process may be a pressure swing adsorption process, or a temperature swing adsorption process. As used herein, pressure swing adsorption includes what is sometimes referred to as vacuum swing adsorption.

With reference to FIG. 1, the process comprises passing the gaseous mixture 30 to an adsorption unit 50. The adsorption unit 50 comprises one or more adsorption vessels 40 where each of the one or more adsorption vessels 40 contains a packed bed region 80 of adsorption particles contiguously arranged, comprising a plurality of perforated adsorbent particles 10. Each of the plurality of perforated adsorbent particles comprise an adsorbent material capable of preferentially adsorbing an at least one more strongly adsorbable gaseous component in the gaseous mixture. Each of the plurality of perforated adsorbent particles (shown in detail in FIGS. 2 and 3) define a plurality of channels 20 numbering at least 10, the plurality of channels 20 for each particle extending through the respective adsorbent particle in a lengthwise direction from a first end 22 to a second end 24.

The process comprises separating the at least one more strongly adsorbable component from an at least one less strongly adsorbable component in the gaseous mixture 30 in the adsorption unit 50 to form a first product stream 60 enriched in the at least one less strongly adsorbable component and a second product stream 70 enriched in the at least one more strongly adsorbable component.

The adsorption particles used in the process may include any of features as described above for the perforated adsorption particles.

For separation by pressure swing adsorption, any known pressure swing adsorption cycle may be used. Pressure swing adsorption steps for pressure swing adsorption cycles are described, for example, in EP2823872 and US 2015/0373713.

EXAMPLES

To quantify potential benefits offered by perforated adsorbent particles, simulations for $H_2$ pressure swing adsorption (also called $H_2$ PSA) and $O_2$ pressure swing adsorption (also called $O_2$ VSA) were run for a range of perforated adsorbent particles under near-retrofit conditions. Sensitivity calculations indicated that mass transfer is more important than flow resistance in $H_2$ PSA, and that flow resistance matters more than mass transfer in $O_2$ VSA. Accordingly, different types of perforated adsorbent particles will be optimal for each process.

Example 1

$H_2$ PSA

A basic $H_2$ PSA process cycle (illustrated in Table 5 of U.S. Pat. No. 6,379,431) was simulated for a feed gas typical of shifted steam methane reforming off gas (shifted syngas) at 29.6 bara pressure, with disposal of waste gas at 1.5 bara (bar absolute). The adsorber vessels each contained two types of adsorbents: a layer of standard activated carbon at the feed end, and a layer of zeolite at the product end. The properties and adsorptive characteristics of the zeolite adsorbent were adjusted to represent either standard 2.0 mm diameter spherical particle or cylindrically-shaped perforated adsorbent particle. The overall bed height was kept constant at 9.75 m and the relative thickness of the activated carbon layer and zeolite layer was adjusted. For both adsorbent particles considered, the simulations of the $H_2$ PSA performance were optimized to set the relative thickness of the activated carbon layer to the zeolite layer and with respect to the amount of gas transferred during the purge step. The sequence and timing of steps in both simulations remained the same. Of the cases studied, maximum productivity and recovery were achieved for a perforated adsorbent particle of the following type:
  particle diameter=3.0 mm;
  particle height=3.0 mm;
  particle void=20%;
  channel diameter=120 μm; and
  number of channels per particle=125.

When compared to a standard 2.0 mm diameter spherical particle, the perforated adsorbent particle mass transfer coefficient was 10.6 times greater and the flow resistance was equal to the resistance of the standard 2.0 mm diameter spherical particle. The amount of shifted synthesis gas processed by each adsorbent vessel over the duration of the feed step increased from 1653 to 1801 mole per $m^3$ of adsorbent in the vessel and the hydrogen recovery increased from 88.9% to 90.5%, attributable solely to the higher mass transfer of the perforated adsorbent particles in the zeolite layer.

Example 2

H$_2$ PSA with a Mixed Zeolite Layer

In example 1, the zeolite layer for the perforated adsorbent particle case consisted solely of particles having a plurality of channels (i.e. perforated adsorbent particles). In this example, the zeolite layer is composed of a 50:50 split of cylindrical perforated adsorbent particles in the top half of the zeolite layer and standard 2 mm spheres in the bottom half of the zeolite layer. The cylindrical perforated adsorbent particles were the same as specified above in example 1.

The amount of shifted synthesis gas processed in the bed with a mixed zeolite layer over the duration of the feed step was 1836 mole per $m^3$ and the recovery was 90.8%.

The mixed zeolite layer provides improved results because at the end of the feed step, the concentration profile of the more adsorbable component has an equilibrium zone closer to the feed end of the bed and a mass transfer zone closer to the product end of the bed. The equilibrium zone may be considered to be saturated with the more adsorbable component. Because perforated adsorbent particles have greater intraparticle void fraction than non-perforated adsorbent particles (i.e. less solid adsorbent than the spherical particles), the spherical particles will hold a greater quantity of the more adsorbable component at equilibrium (mole/$m^3$ bed). The mixed zeolite layer takes advantage of this phenomenon. A greater adsorbent density in the equilibrium zone provides for more adsorbed impurity, thereby allowing more synthesis gas to be processed while ensuring the purity standards are maintained by the rapid mass transfer of the perforated adsorbent particles near the product end of the bed. Replacing some of the perforated adsorbent particles with the spherical, lower void fraction particles, also provides for increased recovery because there is a lower amount of the less adsorbable component trapped in the vessel before regeneration starts.

Example 3

O$_2$ VSA

The sequence and timing of steps that make up the basic process cycle were not changed. Of the cases studied, lowest total cost was achieved for a perforated adsorbent particle of the following type:
  particle diameter=4.0 mm;
  particle height=4.0 mm;
  particle void=20%;
  channel diameter=260 µm; and
  number of channels per particle=47.

When compared to a standard 1.7 mm diameter spherical particle, the perforated adsorbent particle mass transfer coefficient was 1.5 times greater and the flow resistance was 48% lower. Use of these perforated adsorbent particles reduced total cost by 10% by a combination of higher mass transfer and lower pressure drop.

These simulations indicate significant benefits may be achieved by replacing beaded adsorbents with perforated adsorbent particles, even without making substantial changes to the standard process cycles. Much greater benefits are anticipated with fresh designs.

We claim:

1. An adsorption vessel comprising:
    a packed bed region of adsorbent particles contiguously arranged, comprising a plurality of perforated adsorbent particles,
    wherein each perforated adsorbent particle comprises an adsorbent material capable of preferentially adsorbing at least one more strongly adsorbable gaseous component in a mixture comprising at least two gaseous components comprising the at least one more strongly adsorbable component and at least one less strongly adsorbable component, wherein the adsorbent material is a material selected from the group consisting of activated alumina, activated carbon, zeolites, mesopore-structured materials, carbon molecular sieve, metal-organic framework materials, silica gel, and combinations thereof;
    wherein each perforated adsorbent particle defines a respective plurality of channels numbering at least 10, the respective plurality of channels extending through each perforated adsorbent particle in a lengthwise direction from a first end to a second end, and
    wherein each channel of the plurality of channels has an equivalent diameter, d, ranging from 0.05 mm to 1.5 mm, where $$d = 2\sqrt{\frac{A}{\pi}},$$

where A is the cross-sectional area normal to the lengthwise direction for each respective channel.

2. The adsorption vessel of claim 1 wherein the plurality of perforated adsorbent particles number at least 100; and
    wherein the packed bed region has an interparticle void fraction ranging from 0.09 to 0.5.

3. The adsorption vessel of claim 1 wherein the adsorbent particles are irregularly arranged in the packed bed region.

4. The adsorption vessel of claim 1 wherein the adsorbent particles are contiguously arranged in a horizontal and a vertical direction of the packed bed region.

5. The adsorption vessel of claim 1 wherein each adsorbent particle of the adsorbent particles in the packed bed region lies beside at least a portion of at least one neighboring adsorbent particle of the adsorbent particles in the packed bed region and lies above or below at least a portion of at least one other neighboring adsorbent particle of the adsorbent particles in the packed bed region.

6. The adsorption vessel of claim 1 wherein each of the adsorbent particles has an upper end portion facing upward and a lower end portion facing downward, the upper end portion of a first group of adsorbent particles of the plurality of perforated adsorbent particles being in contact with the lower end portion of a second group of adsorbent particles of the packed bed region and/or the lower end portion of the first group of adsorbent particles being in contact with the upper end portion of a third group of adsorbent particles of the packed bed region.

7. The adsorption vessel of claim 6, wherein the second adsorbent particles and/or the third adsorbent particles are perforated adsorbent particles of the plurality of perforated adsorbent particles.

8. The adsorption vessel of claim 1 wherein each channel of the plurality of channels has a respective distance of travel through the channel from the first end to the second end where the respective distance of travel is less than 150% of a respective straight-line distance from the first end to the second end for each channel.

9. The adsorption vessel of claim 1 wherein the channels of the plurality of channels do not intersect one another.

10. The adsorption vessel of claim 1 wherein each perforated adsorbent particle of the plurality of perforated adsorbent particles has a respective void fraction, $$\frac{V_C}{V_T},$$

ranging from 0.05 to 0.5, where $V_C$ is the void volume in each perforated adsorbent particle formed by a respective total number of channels in each respective perforated adsorbent particle, and $V_T$ is the total volume of the perforated adsorbent particle including the void volume, each perforated adsorbent particle having no more and no less than its respective total number of channels.

11. The adsorption vessel of claim 1 wherein each adsorbent particle of the plurality of adsorbent particles has a longest spatial dimension wherein the longest spatial dimension is from 1 mm to 50 mm.

12. A process for separating a gaseous mixture comprising at least two gaseous components, the process comprising:
    passing the gaseous mixture to an adsorption unit, the adsorption unit comprising one or more adsorption vessels of claim 1; and
    separating the at least one more strongly adsorbable component from an at least one less strongly adsorbable component in the gaseous mixture in the adsorption unit to form a first product stream enriched in the at least one less strongly adsorbable component and a second product stream enriched in the at least one more strongly adsorbable component.

13. The process of claim 12 wherein the plurality of perforated adsorbent particles number at least 100; and
    wherein the packed bed region has an interparticle void fraction ranging from 0.09 to 0.5.

14. The process of claim 12 wherein each adsorbent particle of the plurality of adsorbent particles has a respective void fraction, $$\frac{V_C}{V_T},$$

ranging from 0.05 to 0.5, where $V_C$ is the void volume in the adsorbent particle formed by a respective total number of channels in each respective adsorbent particle, and $V_T$ is the total volume of the adsorbent particle including the void volume, each adsorbent particle having no more and no less than its respective total number of channels.

15. A method for making a plurality of adsorbent particles, the method comprising:
    (a) forming a composite rope comprising a precursor for forming an adsorbent material and fibers embedded in the precursor such that the fibers extend in a lengthwise direction of the composite rope, wherein the adsorbent material is a material selected from the group consisting of activated alumina, activated carbon, zeolites, mesopore-structured materials, carbon molecular sieve, metal-organic framework materials, silica gel, and combinations thereof;
    (b) forming dried particle intermediates by drying and dividing the composite rope or by dividing the composite rope to form particle intermediates and drying the particle intermediates; and
    (c) removing the fibers from the particle intermediates by chemically dissolving the fibers and/or firing to burn out the fibers to form the plurality of channels in each adsorbent particle of the plurality of adsorbent particles;
    wherein step (a) comprises extruding a paste comprising the fibers and the precursor through an orifice to form the composite rope.

16. A method for making a plurality of the adsorbent particles, the method comprising:
    (a) forming a composite rope comprising a precursor for forming an adsorbent material and fibers embedded in the precursor such that the fibers extend in a lengthwise direction of the composite rope, wherein the adsorbent material is a material selected from the group consisting of activated alumina, activated carbon, zeolites, mesopore-structured materials, carbon molecular sieve, metal-organic framework materials, silica gel, and combinations thereof;
    (b) forming dried particle intermediates by drying and dividing the composite rope or by dividing the composite rope to form particle intermediates and drying the particle intermediates; and
    (c) removing the fibers from the particle intermediates by chemically dissolving the fibers and/or firing to burn out the fibers to form the plurality of channels in each adsorbent particle of the plurality of adsorbent particles;
    wherein step (a) comprises coating the fibers with a suspension containing the precursor to form a plurality of fibrous unit cells and drawing the plurality of fibrous unit cells together to form the composite rope.

17. The method of claim 16 wherein the fibers are coated by spray-coating and/or dip-coating.

* * * * *